United States Patent
Ghisani

(10) Patent No.: US 7,143,934 B2
(45) Date of Patent: Dec. 5, 2006

(54) ELECTRONIC SECURITY DEVICE FOR AVOIDING CARD FRAUDULENT ACTION IN AUTOMATED TELLER MACHINES AND CARD READER DRIVER INCLUDING SUCH DEVICE

(75) Inventor: Rolando Roberto Ghisani, Buenos Aires (AR)

(73) Assignee: Luis Juan Firpo Polledo, Buenos Aires (AR)

( * ) Notice: Subject to any disclaimer, the term of this patent is extended or adjusted under 35 U.S.C. 154(b) by 0 days.

(21) Appl. No.: 10/859,203

(22) Filed: Jun. 3, 2004

(65) Prior Publication Data

US 2005/0006465 A1  Jan. 13, 2005

(30) Foreign Application Priority Data

Jun. 3, 2003  (AR) .............................. P030101973

(51) Int. Cl.
G07F 19/00  (2006.01)
(52) U.S. Cl. ...................................... 235/379; 235/380
(58) Field of Classification Search ................ 235/379, 235/475, 491, 486, 381, 449, 485, 380, 441; 705/43
See application file for complete search history.

(56) References Cited

U.S. PATENT DOCUMENTS

| | | | | |
|---|---|---|---|---|
| 5,476,168 A | * | 12/1995 | Malzard et al. ............. | 194/203 |
| 5,526,615 A | * | 6/1996 | Kaizu et al. ................. | 52/79.6 |
| 5,635,696 A | * | 6/1997 | Dabrowski .................. | 235/449 |
| 5,850,079 A | * | 12/1998 | Ohwa et al. ................ | 235/475 |
| 5,897,114 A | * | 4/1999 | Arikawa et al. ............ | 271/272 |
| 6,155,604 A | * | 12/2000 | Greene et al. ................ | 283/70 |
| 6,629,643 B1 | * | 10/2003 | Nagata et al. .............. | 235/475 |
| 6,923,372 B1 | * | 8/2005 | Hirasawa et al. ........... | 235/449 |
| 2002/0066790 A1 | * | 6/2002 | Cocco ......................... | 235/491 |

* cited by examiner

Primary Examiner—Steven S. Paik
(74) Attorney, Agent, or Firm—Jacobson Holman PLLC

(57) ABSTRACT

The present invention discloses an electronic security device for automated teller machines and a card reader driver including such device. This electronic device comprises an optoelectronic sensing barrier transversely aligned to the card-in/card-out passage, an electronic circuit which is connected to said sensing barrier, a comparator and timers. The device further includes one or more emergency or alarm signal outputs responsive to the insertion of foreign bodies which, when inserted in the passage, pass through the sensing barrier.

7 Claims, 4 Drawing Sheets

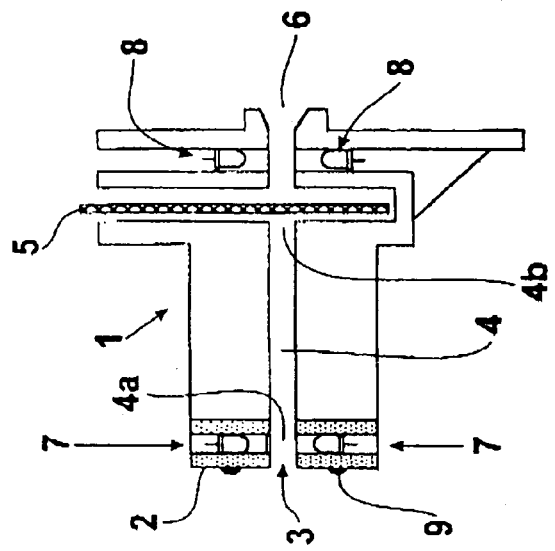
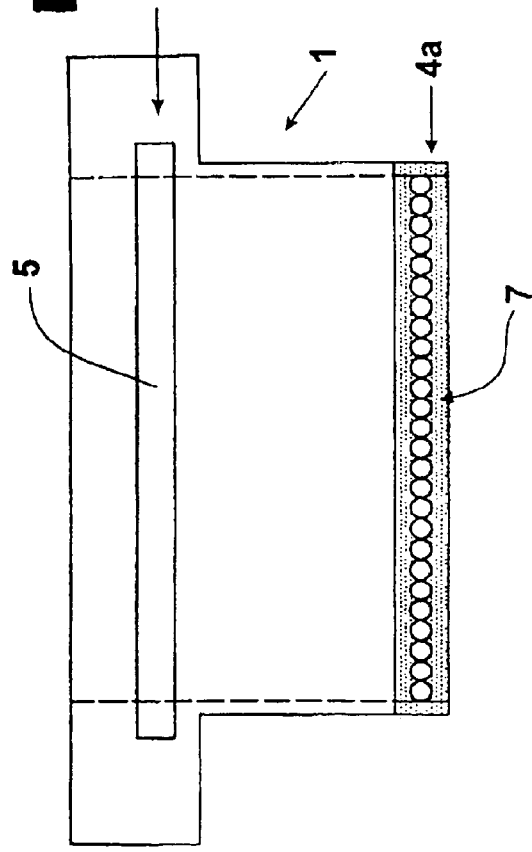
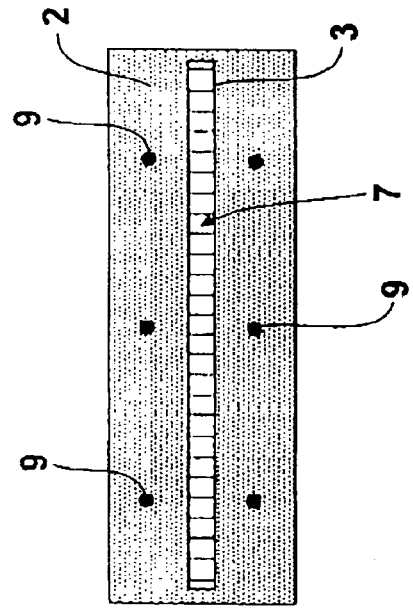

ELECTRONIC SECURITY DEVICE FOR AVOIDING CARD FRAUDULENT ACTION IN AUTOMATED TELLER MACHINES AND CARD READER DRIVER INCLUDING SUCH DEVICE

I-BACKGROUND OF THE INVENTION

1. Technical Field

This invention relates to the field of banking security. Specifically, this invention relates to automated teller machines.

More specifically, this invention relates to an electronic security device based on an optoelectronic sensing barrier aligned transversely to card transaction passage and the card reader driver including such device.

2. Background Art

It is known that ATM (Automated Teller Machines) or automated transaction machines are devices that allow to perform bank transactions. For this purpose, ATMs have a plurality of means enabling to carry out transactions based on the recognition of valid cards that the user inserts in the input/output card slot.

Furthermore, it is known that permanent fraud attempts are performed by criminals who try to seize bank funds. For this purpose, thieves may run card trapping scams usually called card traps. Such card-trapping devices consists of certain elements that, when inserted in the card-in/card-out passage prevent users from retrieving their cards, which remain trapped until the thief fishes it out by means of such card-trapping device.

Currently available security devices cannot efficiently avoid this type of maneuvers or scams, or else are very complex and expensive.

II-SUMMARY OF THE INVENTION

This invention relates to an electronic security device based on an optoelectronic sensing barrier aligned transversely to the passage of transaction cards, and further relates to a card reader driver including such device. The device comprises an optoelectronic sensing barrier transversely aligned to card-in/card-out passage, and an electronic circuit connected to such sensing barrier and comprising one or more emergency or alarm signal outputs responsive to intrusions through the sensing barrier.

DISCLOSURE OF INVENTION

It is an object of this invention to effectively prevent criminal maneuvers with ATM cards.

An advantage of this device is that it allows to sense the area adjacent to the card input slot connected to the card-in/card-out passage of cards in an automated teller machine to detect the presence of foreign means, such as the so-called "card-trapping devices".

A further advantage of this device is that is fully electronic and lacks mechanical elements, which substantially minimize its preventive and corrective maintenance, thus increasing the MTBF, i.e. meantime between failure.

A further advantage of this device is that is capable of detecting the presence of false input slots attached to the external front panel of the original input slot, thus increasing protection against new fraud techniques.

A further objective of this invention is to replace mechanical means with an optoelectronic barrier that employs light radiation, transversely aligned to the card-in/card-out passage, which consists of a plurality of transmitter-receiver means, said light emitted from said transmitter means across the card-in/card-out passage to said receiver means.

A further advantage is the flexibility to adapt to different variants, since the transmitter/receiver means can emit either infra red or other types of light radiation. In addition, the device is suitable to include a secondary optoelectronic barrier situated behind the movable wall panel or guillotine to detect cards trapped in the card input channel.

A further advantage of the invention is that it can include different mechanical, optical, etc. sensors on the external front panel to detect the application of false sleeves.

A further advantage of this device is that it can be easily adapted to reader drivers, enabling operation connected to a conventional width sensor or guillotine sensor which are normally built in such reader drivers.

A further advantage is that the timers (analogue & digital timers with built-in microprocessors or any combinations thereof) of the electronic circuit or unit can in the presence of certain conditions send the ATM a signal to be redirected to the network indicating the presence of a card trap device installed therein. Further, it has a relay which is operated in case of a warning signal, thus enabling local action (beeper, lighting signaling or any other deterrent method).

III-DESCRIPTION OF DRAWINGS

To provide greater clarity and to facilitate understanding of the object of this invention several illustrations are included herein to describe the invention in one of its preferred embodiments, however, such descriptions and illustrations are by way of examples and no unnecessary limitations are to be implied therefrom.

FIG. 1 is a longitudinal view of a card reader driver incorporating an exemplary embodiment of the present invention.

FIG. 2 is a front view of the reader driver.

FIG. 3 is a top view of the reader driver.

The same numbers, letters or combinations thereof are used as reference characters to designate same parts or related parts of the invention appearing in more than one view.

Figure 4:
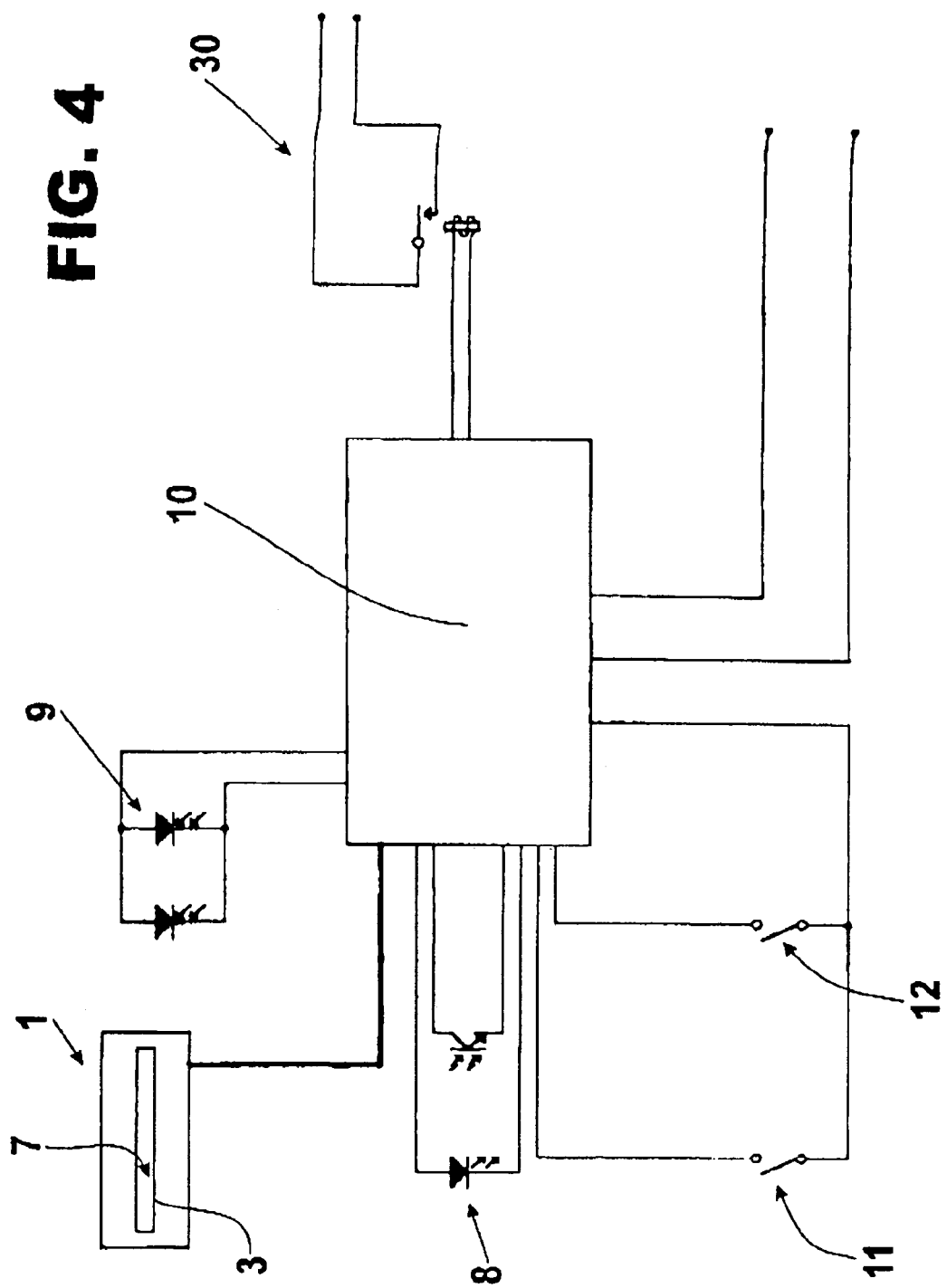
FIG. 4 is a schematic diagram representative of the component parts of the present device and card driver.
Figure 5:
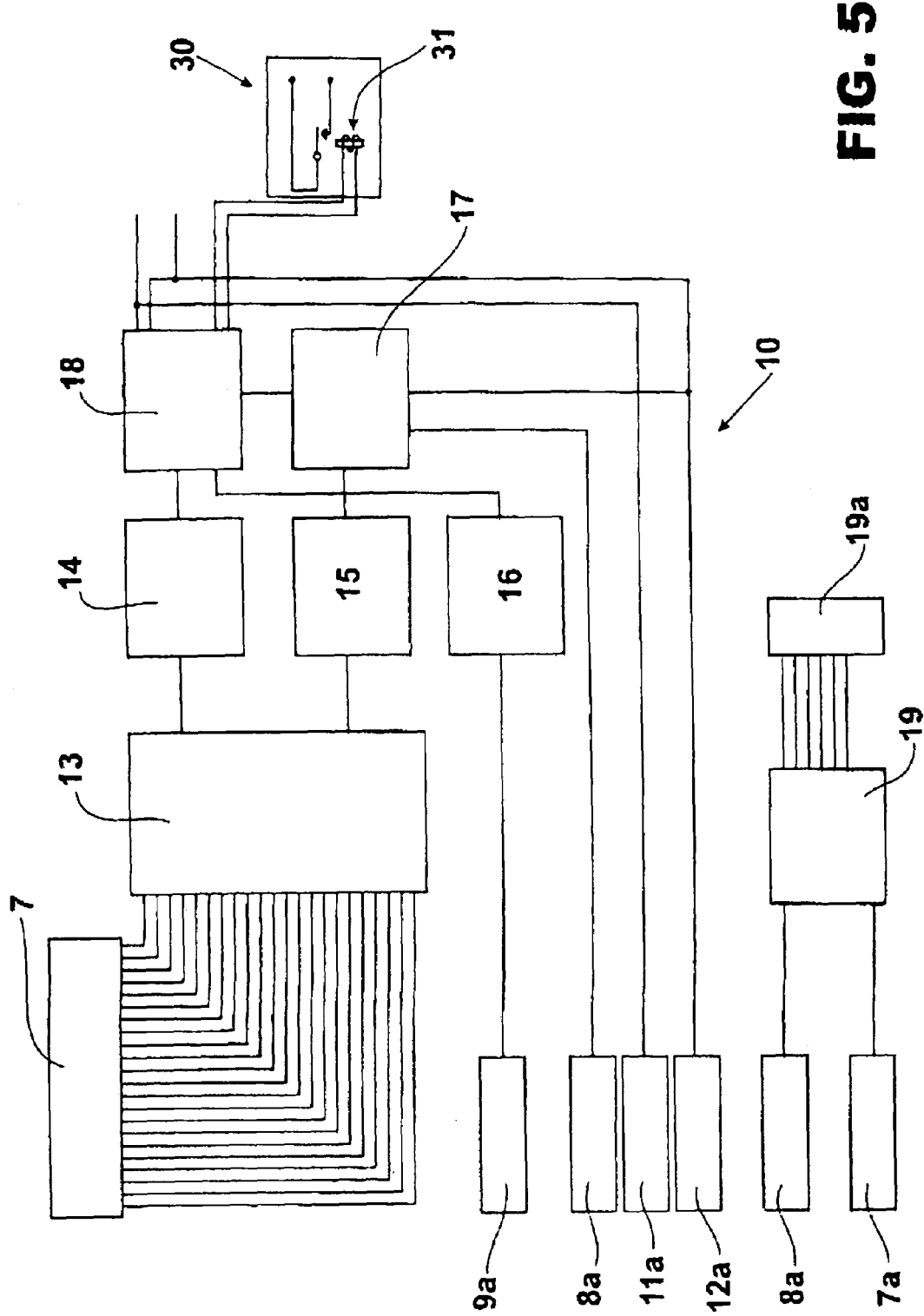
FIG. 5 is a schematic diagram representative of an exemplary embodiment of the electronic circuit.
Figure 6:
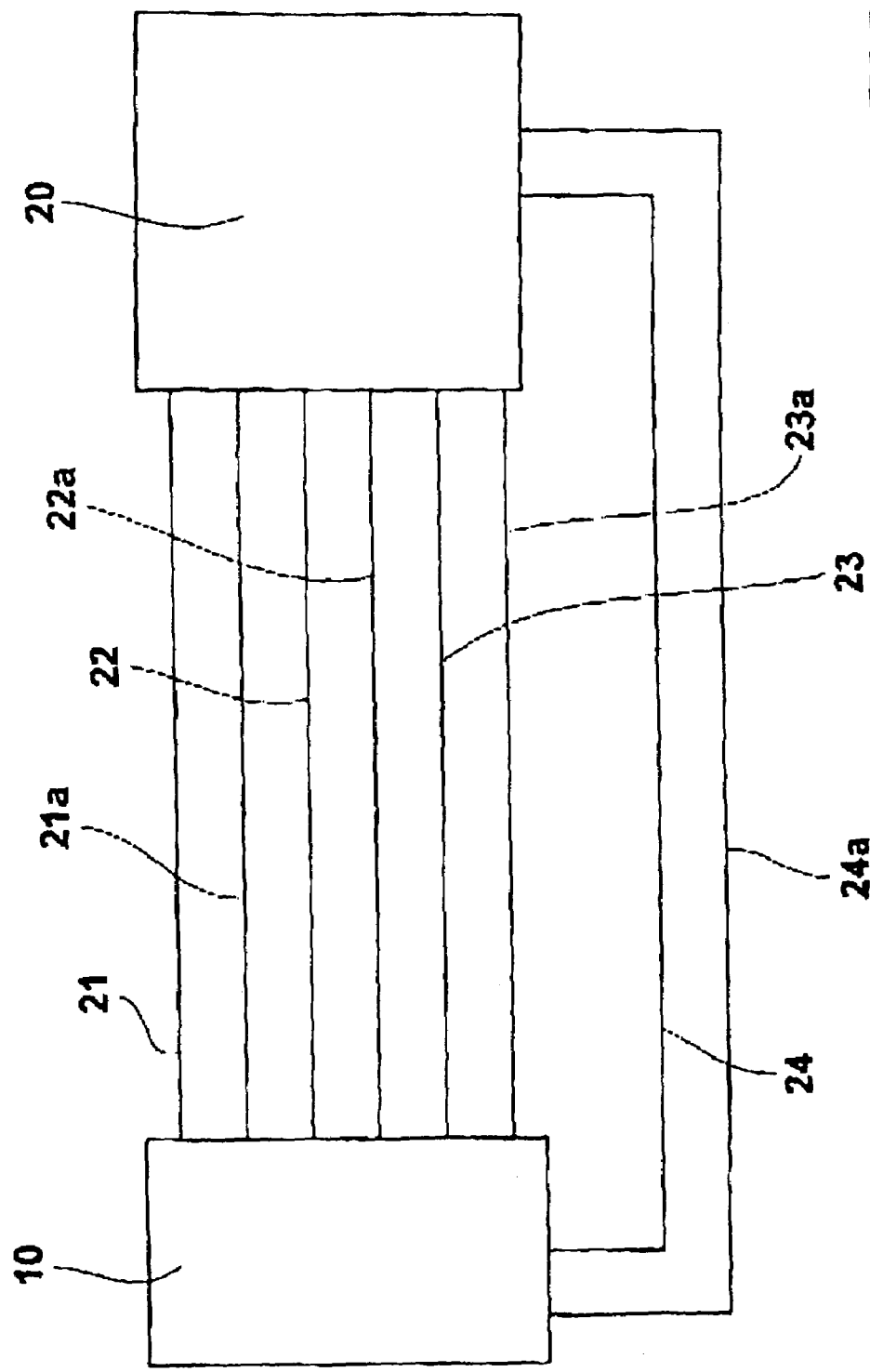
FIG. 6 is a schematic view representative of the connection between the present device and the card reader means.

REFERENCE NUMERALS IN DRAWINGS (1) Reader driver
(2) External front panel
(3) Card input opening or slot
(4) Card-in/card-out passage
(4*a*) Primary passage area (4)
(4*b*) Intermediate area (between the input opening (3) and the internal operational area (6)
(5) Movable wall panel (guillotine-type cutter)
(6) Internal operational area
(7) (primary or preceding) optoelectronic barrier
(7*a*) Transmitter supply unit (7)
(8) Secondary or (beneath) optoelectronic barrier
(8*a*) Signal of (8)
(9) Front sensors or detectors (for attached false sleeve slots)
(9*a*) Signal of (9)

(10) Electronic circuit
(11) Width sensor
(11a) Signal of (11)
(12) Guillotine sensor
(12a) Signal of (12)
(13) First combinational comparator
(14) First timer
(15) Second timer
(16) Third timer
(17) Second combinational comparator
(18) Alarm-cycle generator
(19) Power supply
(19a) Module connections
(20) Card reader header
(21) Guillotine switch signal
(21a) Ground of (21)
(22) Width switching signal
(22a) Ground of (22)
(23) Guillotine solenoid supply unit
(23a) Ground of (23)
(24) Device supply unit
(24a) Ground of (24)
(30) External Alarm
(31) Relay to (30)

IV-DETAILED DESCRIPTION

The present invention consists of an electronic security device for automated teller machines comprising an optoelectronic sensing barrier (7) transversally aligned to a card-in/card-out passage (4), further comprising an electronic circuit (10) connected to such sensing barrier (7) and including one or more emergency or alarm signal outputs responsive to intrusions through the sensing barrier (7); the invention further relates to a card reader driver (1) including such device.

More specifically, the present electronic security device is applicable to an automated teller machine (ATM) for the detection of foreign instruments or bodies that can be inserted in the card-in/card-out transaction passage (4). Such passage (4) is arranged between an input opening (3) situated on the external front panel and an internal operational area (6) of the automated teller machine. In the intermediate area of such passage (4b) a movable wall (5) having temporary closure can be provided to operate as a guillotine-type device.

The ATM card reader driver (1) comprises a card-in/card-out passage (4) extending between an input opening (3) situated on the external front panel and an internal operational area (6).

In an intermediate area (4b) situated between a primary area (4a) and the internal operational area (6) there is a movable wall (5) which moves upwards and downwards like a guillotine type-cutter, temporarily blocking such input/output passage.

In the primary area (4a) of the input/output passage (4) there is an optoelectronic sensing barrier (7) aligned transversely to such passage (4). This optoelectronic sensing barrier (7) comprises a plurality of light transmitter/receiver devices which, relative to the passage (4), are transversely aligned on both opposite sides thereof. Thus, the light rays emitted by these transmitter means propagate across the input/output passage (4) until reaching the receiver means.

In different embodiments of the invention, the light emitted can be light of the visible spectrum, ultraviolet light, infra red light, etc. Transmitters can be light emitting diodes, incandescent lamps, fluorescent lamps or other light-emitting source. Light receivers can be photo diodes, photo transistors, LDR, photo voltaic cells or other light-sensitive element.

Furthermore, the embodiments contemplate the inclusion of sensing means on the external front panel (9) of the card reader driver (1), capable of detecting the attachment of false external front panels carrying card-trapping elements.

In other embodiment of the invention the arrangement of a secondary optoelectronic barrier (8) is provided which is positioned intermediate the movable wall panel (5) and the internal operational area (6).

Furthermore, the present device comprises an electronic circuit (10) which processes the signals from the sensing barrier (7) and which is capable of generating alarm signals (18).

Such electronic circuit comprises a comparator stage, a timer stage and an alarm-cycle generator (18). Thus, in this exemplary embodiment of the invention the electronic circuit (10) comprises a first combination comparator and a second combinational comparator (13) (17), a first timer, a second timer and a third timer (14) (15) (16) and one alarm-cycle generator (18).

OPERATION

When an object is inserted in the input opening (3) of the card reader driver (1), such object is intercepted by one or more light beams of the optoelectronic barrier (7) which operates as a scanner of such input opening (3).

If the interruption of light is total (the entire light beams are interrupted), it may be a valid card or a card-trapping device the width of which covers the full input opening area (3).

A valid card does not remain in this position for more than a few seconds since the card reader driver (1) pulls the card to read it inside (6) (the same occurs if the user forgets to take his/her card from the card reader driver (1). If the interruption continues for more than the preset time, the object is a card trap device and an alarm cycle is triggered.

If the interruption of the optoelectronic barrier (7) is partial, the object cannot be a card; if the same remains inserted for another preset time it is a card-trapping device and the alarm cycle is triggered (18).

The width sensor signal (11) is used to certify the presence of an element having a similar width range to a real card.

The open signal of the movable wall (guillotine is open), together with the partial interruption of the barrier (7) triggers the alarm cycle (18).

The open signal of the movable wall, together with the total interruption of the barrier (7) generates an additional interval cycle (waiting for an additional time frame) and after the interval cycle lapses the alarm process restarts.

If the movable wall (5) remains open, the interruption of the barrier beams (7) is total and the secondary barrier (8) behind the movable wall (5) is disrupted, indicating the presence of a card trapped in the input slot (4) of the card reader (1), and generating no alarm signal.

The system can be used as a trapping-device detector in deposit boxes and cash dispensers.

The primary optoelectronic barrier (7) propagates the signals of infra red beams to the electronic circuit (10).

The mechanical or primary sensing devices (9) refract their respective signals (9a) to the electronic circuit (10).

The width sensor (11) propagates the signal (11a) to the electronic circuit (10).

The guillotine sensor (12) of the movable wall or guillotine-type device (5) propagates the signal (12a) to the electronic circuit (10).

The secondary optical barrier (8) behind the movable wall (5) propagates the signal (8a) to the electronic circuit (10).

The electronic circuit (10) sends the alarm signal to the ATM machine.

The electronic circuit (10) activates the relay (31) in case of detecting a card trapping device (external warning).

The function of the primary barrier (7) is to detect either total or partial interruption of one or more of its beams (including that of transparent objects in the primary area (4a) of the passage (4), in adjacent sides of the input opening (3) of the front panel (2).

The function of the width sensor (11) is to detect the entry or presence within the passage (4) of an object having a similar width to a valid cord. This sewing device is an electromechanical sensor (e.g. micro switch) which is operated by the side pressure applied by the card in the passage 4.

The function of the guillotine sensor (12) is to detect the position of the movable wall or guillotine-type device (5) [close is normal mode, open is alert mode]. This sensing device is an electromechanical sensor [e.g. micro switch] which is operated according to the position of the movable wall 5.

The secondary barrier (8) operates as a trapped/stuck card sensor when it detects the presence of a trapped card [due to deformation or other cause] inside the input passage (4).

The function of the front sensors or detectors (9) is to detect the presence of a "false" sleeve with a card trap that a scammer intentionally attaches over the ATM slot front (2) of the card reader driver (1). These sensing devices can be one or more mechanical sensors and are installed on the external front (2) panel; and are operated by the pressure applied over the sleeve attached to the front panel (2) of the card reader (1). In a further variant one or more light sensors can be installed in the front panel (2) of the card reader (1). These receivers sense the light variation [darkening on the original front (2)], which occurs when a false front or sleeve is installed.

This device can be added to existing card reader drivers (1) or else, new card reader units (1) can be manufactured with this new device.

What is claimed:

1. An electronic security device for automated teller machines to avoid card fraudulent actions, which is applicable to an automated transaction machine for the detection of the insertion of a foreign instrument or body into a card-in/card-out transaction passage, said card-in/card-out transaction passage including a primary portion, and an intermediate portion that includes a movable wall that can block the card-in/card-out passage, with said passage extending from a card input opening on an external front panel of the device through the primary portion then the intermediate portion to an internal operational area in the automated teller machine, said device further comprising, inside the card-in/card-out passage, at least one optoelectronic sensing barrier transversally aligned to said passage and located in the primary portion and in front of said movable wall; wherein the optoelectronic sensing barrier comprises light transmitter and receiver means that are, relative to the passage, transversely aligned on opposite sides of the passage and occupy the entire width of the passage, so that the transmitter means emits light through the entire width of the passage to reach the receiver means to detect whether the optoelectronic sensing barrier is partially or completely blocked by the foreign instrument or body.

2. The electronic security device for automated teller machines according to claim 1, wherein the primary portion is located between said card input opening and said intermediate portion.

3. The electronic security device for automated teller machines according to claim 1, wherein said intermediate portion is located between said primary portion and the internal operational area.

4. The electronic security device for automated teller machines according to claim 1, wherein the light emitted by the transmitter means is selected from the group consisting of visible spectrum light, ultraviolet light, and infrared light.

5. The electronic security device for automated teller machines according to claim 1, wherein the transmitter means is emitting diode, incandescent lamp, or fluorescent lamp, and the receiver means is photo diode, photo transistor, or photo voltaic cells.

6. The electronic security device for automated teller machines according to claim 1, wherein said optoelectronic sensing barrier is associated with an electronic circuit which is connected to at least one emergency or alarm signaling output.

7. A card reader driver used in an automated teller machine that includes an electronic security device for automated teller machines to avoid card fraudulent actions, said electronic security device being applicable to an automated transaction machine for the detection of the insertion of a foreign instrument or body into a card-in/card-out transaction passage, said card-in/card-out transaction passage including a primary portion, and an intermediate portion that including a movable wall that can block the card-in/card-out passage, with said passage extending from a card input opening on an external front panel of the device through the primary portion then the intermediate portion to an internal operational area in the automated teller machine, said device further comprising, inside the card-in/card-out passage, at least one optoelectronic sensing barrier transversally aligned to said passage and located in the primary portion and in front of said movable wall; wherein the optoelectronic sensing barrier comprises light transmitter and receiver means that are, relative to the passage, transversely aligned an opposite sides of the passage and occupy the entire width of the passage so that the transmitter means emits light through the entire width of the passage to reach the receiver means to detect whether the optoelectronic sensing barrier is partially or completely blocked by the foreign instrument or body.

* * * * *